United States Patent [19]

Okada et al.

[11] 3,876,584

[45] Apr. 8, 1975

[54] POLYHYDANTOIN AND PRODUCTION PROCESS THEREOF

[75] Inventors: Shin-Ichi Okada; Masahiro Suzuki; Akio Omi, all of Hitachi, Japan

[73] Assignee: Hitachi Cable, Ltd., Tokyo, Japan

[22] Filed: July 24, 1973

[21] Appl. No.: 382,189

[52] U.S. Cl.... 260/77.5 C; 260/77.5 CH; 260/309.5
[51] Int. Cl............................................ C08g 22/00
[58] Field of Search..... 260/77.5 C, 77.5 CH, 309.5

[56] References Cited
UNITED STATES PATENTS 3,684,774   8/1972   Merten et al. ................. 260/77.5 C

*Primary Examiner*—M. J. Welsh
*Attorney, Agent, or Firm*—Craig & Antonelli

[57] ABSTRACT

A novel polyhydantoin is produced by heating at a temperature of 100° to 350°C. at least one compound represented by the formula,

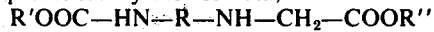

wherein R is a divalent aliphatic, cycloaliphatic, or aromatic residue, and R' and R'' are independently hydrogen or monovalent aliphatic, cycloaliphatic, or aromatic residues. The said polyhydantoin is excellent in thermal resistance, electrical strengths, mechanical strengths, and chemical resistance, and may be used as a material for molding, lamination, impregnation, and adhering.

13 Claims, No Drawings

POLYHYDANTOIN AND PRODUCTION PROCESS THEREOF

This invention relates to a heat-resistant polymer having in its molecule a hydantoin ring, and to a process for producing the same.

As such a polymer, there has generally been known a copolymer obtained from a diglycine derivative and a diisocyanate. Since the process for the preparation of such a copolymer involves formation of a prepolymer by addition reaction of a diisocyanate to a diglicine derivative and cyclization which takes place subsequently to the addition reaction to form a hydantion ring. Thus, copolymerization reaction proceeds in said process, and hence, the mole ratio between the diglycine derivative and the diisocyanate plays an important role. These two reactants should always be maintained in an equimolar relation to each other, and if such a molar relation is disturbed, the molecular weight of the reaction product becomes insufficient corresponding to the degree of disturbance, thus leading to marked deterioration in the favorable thermal resistance, tensile strength, abrasion resistance, and chemical resistance, which this type of polymer has otherwise.

Such a phenomenon raises a serious trouble in securing the quality of polyhydantoin and in promoting practical application thereof. Moreover, a process involving adjustment of the mole ratio of reactants, which is a troublesome procedure in process control, is obviously disadvantageous from an industrial viewpoint, as compared with an alternative process which does not need such an adjustment.

This invention provides a novel polyhydantoin consisting essentially of homopolymer which has been freed from the aforesaid disadvantages.

An object of this invention is to provide a polyhydantoin of an entirely new modecular structure, and another object is to provide an advantageous process for producing a polyhydantoin based on a new idea. A further object of this invention is to provide an advantageous process for producing a polyhydantoin, wherein adjustment of the mole ratio of reactant materials is not needed at all.

According to this invention, there is provided a polyhydantoin having the general formula

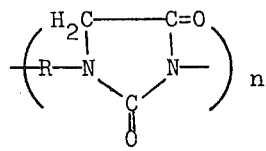

wherein R is a divalent aliphatic, cycloaliphatic, or aromatic residue, and $n$ is an integer of 30 or more, preferably 30 to 8,000. This invention also provides a process for producing the said polyhydantoin, which comprises polycondensation of at least one compound having the general formula R'OOC—HN—R—NH—CH$_2$—COOR'' (I), wherein R has the same meaning as defined above, and R' and R'' are independently hydrogen or monovalent aliphatic, cycloaliphatic, or aromatic residues.

The compounds represented by the formula (I) can be further expressed by the following more specific general formulas, though not restricted thereto:

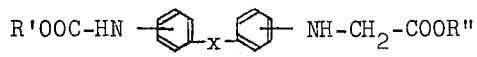

(where $x$ is CH$_2$, CO, S, SO$_2$, or a single linkage);

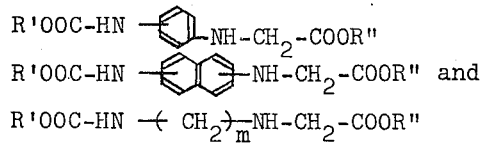

(where $m$ is 1 to 10).

Examples of these compounds to be used in this invention are as shown below.

N-Carbomethoxy-N'-carboxymethylbenzidine, N-carboethoxy-N'-carbomethoxymethylbenzidine, N-carboethoxy-N'-carboethoxymethylbenzidine, N-carbomethoxy-N'-carbomethoxymethyl-4,4'-diaminodiphenyl ether, N-carboethoxy-N'-carboethoxymethyl-4,4'-diaminodiphenyl ether, N-carbomethyoxy-N'-carbomethoxymethyl-4,4'-diaminodiphenylmethane, N-carbomethoxy-N'-carboethoxymethyl-4,4'-diaminodiphenylmethane, N-carboethoxy-N'-carboethoxymethyl-4,4'-diaminodiphenylmethane, N-carboethoxymethyl-4,4'-diaminodiphenylmethane, N-carboethoxy-N'-carbopropoxymethyl-4,4'-diaminodiphenylmethane, N-carbocyclohexoxy-N'-carboethoxymethyl-4,4'-diaminodiphenylmethane, N-carbophenoxy-N'-carboethoxymethyl-4,4'-diaminodiphenylmethane, N-carbomethoxy-N'-carboethoxymethyl-4,4'-diaminodiphenyl sulfone, N-carboethoxy-N'-carboethoxymethyl-4,4'-diaminodiphenyl sulfone, N-carbomethoxy-N'-carboethoxymethyl-4,4'-diaminobenzophenone, N-carboethoxy-N'-carboethoxymethyl-4,4'-diaminobenzophenone, N-carboethoxy-N-'-carbophenoxymethyl-4,4'-diaminobenzophenone, N-carbomethoxy-N'-carboethoxymethyl-o-toluidine, N-carboethoxy-N'-carboethoxymethyl-o-toluidine, N-carbomethoxy-N'-carboethoxy-4,4'-diaminodiphenyl sulfide, N-carboethoxy-N-carboethoxymethyl-4,4'-diaminodiphenyl sulfide, N-carbomethoxy-N'-carbomethoxymethyl-p-phenylenediamine, N-carbomethoxy-N'-carboethoxymethyl-p-phenylenediamine, N-carboethoxy-N'-carbomethoxymethyl-m-phenylenediamine, N-carbomethoxy-N'-carbomethoxymethyl-m-phenylenediamine, N-carboethoxy-N'-carboethoxymethyl-m-phenylenediamine, N-carbophenoxy-N'-carboethoxymethyl-m-phenylenediamine, N-carbophenoxy-N'-carbophenoxymethyl-m-phenylenediamine, N-carboethoxy-N'-carbopropoxymethyl-m-phenylenediamine, N-carboxy-N'-carbobutoxymethyl-m-phenylenediamine, N-carboxy-N'-carboxymethyl-m-phenylenediamine, N-carboethoxy-N'-carboxymethyl-1,5-diaminonaphthalene, N-carbomethoxy-N'-carboethoxymethyl-1,5-diaminonaphthalene, N-carboethoxy-N'-carboethoxymethyl-1,5-diaminonaphthalene, N-carboethoxy-N'-carbobutoxymethyl-1,5-diaminonaphthalene, N-carboxy-N'-carboxymethylethylenediamine, N-carbomethyoxy-N'-carboethoxymethyl-1,3-diaminopropane, N- carboethoxy-N'-carboethoxymethyl-1,4-diaminobutane, N-carboethoxy-N'-carboethoxy-1,6-diaminohexane, N-carbophenoxy-N'-carboethoxy-1,6-diaminohexane, N-carboethoxy-N'-carboethoxy-1,4-diaminocyclohexane, N-carboethoxy-N'-carboxymethyl-1,4-diaminocyclohexane, N-carbomethoxy-N'-carboethoxymethyl-1,8-diaminooctane, N-carboethoxy-N'-carboethoxymethyl-1,8-diaminooctane, N-carboethoxy-N'-carboxymethyl-1,8-diaminooctane, etc. These compounds may be used alone or in admixture of two or more.

Synthesis of these compounds comprises the following steps in the case of, for example, N-carbomethoxy-N'-carbomethoxymethyl-4,4'-diaminodiphenylmethane: Af first, 1 mole of 4,4'-diaminodiphenylmethane is added to water containing a hydrogen halide acceptor such as calcium carbonate; to the resulting mixture is added 1 mole of halogenated methyl acetate in small portions with stirring and the mixture is allowed to react with stirring at 50°C. for 4 hours; to the reaction mixture is then added 1 mole of halogenated methyl carbonate in small portions with stirring and allowed to react with stirring for a further 3 hours; the reaction product is washed with water and then recrystallized from methanol.

Although the method for synthesizing the above-noted compounds is, of course, not limited to that mentioned above as an example, yet the above-mentioned method is applicable to the synthesis of other compounds, in which cases diamines, halogenated acetate ester compounds, and halogenated carbonate ester compounds are properly selected in accordance with the molecular structure of the desired final compounds.

The polycondensation reaction to form a polymer is usually conducted in an organic solvent such as m-cresol, phenol, xylenol, N,N-dimethylformamide, N,N-dimethylacetamide, N-methyl-2-pyrrolidone, or the like, and, if necessary, a diluent such as benzene, toluene, ethanol, propanol, butanol, furfural, methyl Cellosolve, ethyl Cellosolve, or the like.

The temperature of polycondensation is preferably 100° to 350°C., more preferably 120° to 250°C.

The reaction is desirably conducted under varying conditions according to the type of R' in the formula (I). Generally speaking, when R' is an aromatic residue such as phenyl radical, the reaction proceeds according to the following scheme:

The above reactions are based on the thermal splitting-off of R'OH, the formation of NCO radical resulting therefrom, and the addition reaction of the NCO radical to NH radical. The formation of a polymer of the formula (II) and the subsequent cyclization to hydantoin ring (III) proceed with comparatively high efficiency. On the other hand, when R' is an aliphatic or a cycloaliphatic residue, the splitting reaction to form a NCO radical takes place with great difficulty so that it becomes desirable to call for the assistance of a catalyst. As such a catalyst, there may be used those compounds which have been known as aminolysis catalysts, such as, for example, lead monoxide, magnesium oxide, antimony trioxide, and other metallic oxides, tetrabutyl titanate and other organometallic compounds. In this case, the type of reaction becomes as follows:

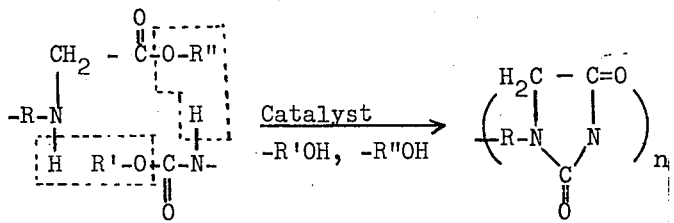

The presence of a catalyst promotes splitting-off of R'OH and R"OH, and the formation of a polymer proceeds efficiently.

In either case, the formation of a polymer may be recognized by an increase in viscosity of the reaction system, and the degree of formation may be confirmed by taking, for example, reduced specific viscosity as a measure.

The polyhydantoin of this invention is characterized by being a homopolymer having a recurring unit of the formula

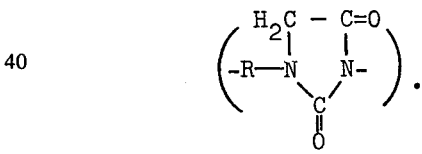

This originates from the molecular structure of the starting material represented by the formula (I). It is a great advantage that since the homopolymer is formed by condensation reaction of a single starting material, the molecular weight always becomes large and there is no formation of such a low molecular weight polymer as results from an unbalance in mole ratio between the reactants in the case where the polymer is formed by the reaction between two components as mentioned in the introductory part hereof.

The invention is further explained below in detail with reference to examples which are by way of illustration and not by way of limitation.

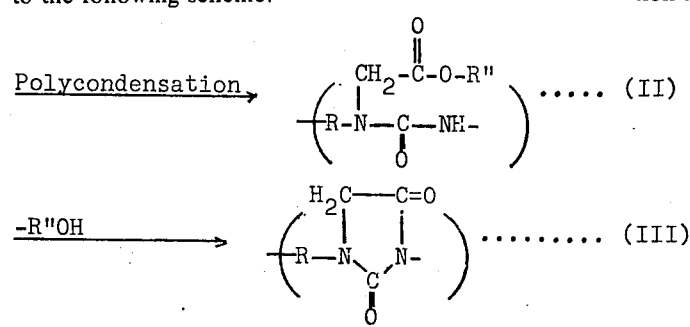

EXAMPLE 1

In a 2-liter flask were placed 374.4 g of N-carboethoxy-N'-carboethoxymethyl-4,4'-diaminodiphenylmethane, 280.0 g of commercial grade m-cresol, and 0.4 g of lead oxide. The contents of the flask was heated with stirring under a stream of nitrogen and the temperature was elevated to 190°C. over a period of about 2 hours. While the temperature was being elevated, distillation of the ethanol formed by the reaction began to be observable at about 180°C. When heating was continued with stirring at 190°C. for about 6 hours, about 80% of the theoretical amount of ethanol was distilled and the viscosity of the contents of flask was increased.

After an additional amount of 140 g of m-cresol was added and the temperature was elevated to 195°C., the reaction was continued for about 4 hours, after which the flask contents became a viscous clear liquid. At this point, about 330 g of m-cresol was poured into the flask to terminate the reaction. The flask contents were left standing to cool.

A portion of the reaction solution was added to a large volume of methanol to precipitate a yellowish white polymer. The polymer was tested in m-cresol for the reduced specific viscosity, $\eta sp/c$ (c=0.5 g/dl), and found to be 0.65 (dl/g).

EXAMPLE 2

Following the procedure of Example 1, formation of a polymer was carried out by use of 376.4 g of N-carboethoxy-N'-carboethoxymethyl-4,4'-diaminodiphenyl ether, 285.0 g of m-cresol, and 0.3 g of lead monoxide. The reduced specific viscosity of the polymer was 0.73 (dl/g) as measured under the same conditions as in Example 1.

EXAMPLE 3

Following the procedure of Example 1, formation of a polymer was carried out by use of 260.4 g of N-carbomethoxy-N'-carboethoxymethyl-m-phenylenediamine, 360.2 g of N-carboethoxy-N'-carboethoxymethylbenzidine, 436.2 g of m-cresol, and 0.6 g of lead monoxide. The reduced specific viscosity of the resulting polymer was 0.75 (dl/g).

EXAMPLE 4

In a 2-liter flask were placed 423.1 g of N-carbophenoxy-N'-carboethoxymethyl-4,4'-diaminodiphenylmethane and 296.5 g of m-cresol. The mixture was heated with stirring while passing a stream of nitrogen, and the temperature was elevated to 200°C. over a period of 2 hours. The reaction was continued for 10 hours while removing the phenol and methanol which were formed.

To the contents of flask, which had been increased in viscosity as a result of reaction, was added 150 g of m-cresol. The mixture was maintained at 200°C. for a further 5 hours to continue the reaction, and thereafter admixed with 350 g of cold m-cresol to terminate the reaction.

The reduced specific viscosity of the resulting polymer was 0.51 (dl/g), as measured under the same conditions as in Example 1.

EXAMPLE 5

In a 2-liter flask were charged 328.4 g of N-carbomethoxy-N'-carbomethoxymethyl-4,4'-diaminodiphenylmethane, 264.0 g of m-cresol and 1.3 g of tetrabutyl titanate. The mixture was heated with stirring while passing a stream of nitrogen, and the temperature was elevated to 195°C. over a period of 2 hours. The reaction was continued for a further 5 hours while removing the methanol which was by-produced. After completion of the reaction, the reaction mixture was cooled by addition of 528 g of m-cresol. The reduced specific viscosity of the polymer thus obtained was 0.67 (dl/g).

EXAMPLE 6

In a 2-liter flask were placed 300.3 g of N-carbomethoxy-N'-carboxymethylbenzidine, 250 g of m-cresol, and 1.3 g of tetrabutyl titanate. The reaction system was heated with stirring while passing a stream of nitrogen, and the temperature was elevated to 195°C. over a period of about 2 hours. The reaction was continued for a further 8 hours while removing the by-produced methanol and water. Then, the temperature of the reaction system was elevated to 200°C., allowed to react at this temperature for 5 hours, and thereafter admixed with 500 g of cold m-cresol to terminate the reaction. The reduced specific viscosity of the polymer thus obtained was 0.53 (dl/g).

EXAMPLE 7

In a 2-liter flask were placed 406.5 g of N-carbophenoxy-N'-carboethoxymethyl-4,4'-diaminodiphenyl sulfone and 315 g of m-cresol. The mixture was heated with stirring while passing a stream of nitrogen, and the temperature was elevated to 195°C. over a period of about 2 hours. The reaction was continued for a further 8 hours while removing the by-product phenol. After completion of the reaction, the reaction mixture was cooled by addition of 630 g of cold m-cresol. The reduced specific viscosity of the polymer thus formed was 0.58 (dl/g).

EXAMPLE 8

A polyhydantoin solution was obtained from 326.3 g of N-carbomethoxy-N'-carboxymethyl-1,5-diaminonapthalene, 248 g of m-cresol, and 1.7 g of dibutyltin dilaurate under the same heating conditions as in Example 6. The amount of m-cresol added in the final step had been 741 g. The reduced specific viscosity of the polymer was 0.69 (dl/g).

EXAMPLE 9

In a 2-liter flask were placed 274.3 g of N-carboethoxy-N'-carboethoxymethyl-1,6-diaminohexane, 182 g of m-cresol, and 0.5 g of lead monoxide. The mixture was heated with stirring while passing a stream of nitrogen, and the temperature was elevated to 170°C. over a period of about 2 hours. The reaction was continued for a further 3 hours at this temperature and then for 4 hours at 190°C. Thereafter, 420 g of m-cresol was added to terminate the reaction. The reduced specific viscosity of the polymer thus formed was 0.55 (dl/g).

EXAMPLE 10

By using 356.4 g of N-carboethoxy-N'-carboethoxymethyl-4,4'-diaminobenzophenone, 278 g of m-cresol, and 1.4 g of tetrabutyl titanate, a polyhydantoin solution was obtained under the same heating conditions as in Example 5, the amount of m-cresol added in the final step having been 556 g. the reduced specific viscosity of the polymer thus formed was 0.65 (dl/g).

REFERENTIAL EXAMPLE

In a 2-liter flask were placed 250 g (1 mole) of diphenylmethane-4,4'-diisocyanate, 407 g (1.1 moles) of N,N'-bis(carboethoxymethyl)-4,4'-diaminodiphenylmethane and 1,000 g of m-cresol. The mixture was heated with stirring while passing a stream of nitrogen, and the temperature was elevated to 180°C. over a period of about 2 hours. The reaction was continued for a further 18 hours at this temperature. After completion of the reaction, the reaction mixture was cooled by adding 540 g of m-cresol. The polymer obtained in the present Example had a reduced specific viscosity of 0.21 (dl/g).

In Table 1 are shown characteristics of films obtained by coating the final solution obtained in each of the above Examples and Referential Example, admixed with 2.8 g of tetrabutyltitanate, on a plate of glass and then heating at 220°C. for 20 minutes.

Table 1

| Example No. | Thickness (mm) | Tensile strength (kg/15mm) | Ultimate elongation (%) | Tear strength (g) |
|---|---|---|---|---|
| 1 | 0.050 | 9.40 | 48.7 | 20.8 |
| 2 | 0.050 | 10.10 | 46.4 | 20.0 |
| 3 | 0.050 | 9.00 | 49.0 | 21.5 |
| 4 | 0.050 | 9.20 | 47.2 | 21.0 |
| 5 | 0.050 | 9.80 | 48.8 | 21.2 |
| 6 | 0.050 | 9.20 | 45.7 | 20.1 |
| 7 | 0.050 | 10.20 | 47.0 | 21.8 |
| 8 | 0.050 | 9.40 | 45.2 | 22.4 |
| 9 | 0.050 | 9.70 | 82.0 | 23.2 |
| 10 | 0.050 | 9.80 | 46.9 | 20.6 |
| Referential Example | 0.050 | 3.90 | 11.2 | 5.2 |

Note:
(1) The tensile strength and the ultimate elongation were measured at a tensile speed of 5 mm/min.
(2) The tear strength was measured by Elmendorf method at 23°C. and 60 % relative humidity.

In Table 2 are shown characteristics of insulated electric wires manufactured by use of each of the final solutions in the aforementioned Examples and Referential Example. The insulated wire was manufactured by coating the solution admixed with 2.8 g of tetrabutyltitanate on an anneeled copper wire, 1.00 mm in diameter, in an ordinary way, and then baking the coated wire.

It will be easily understood from the foregoing explanation that the polyhydantoin of this invention is characterized by being obtained from a specific and single reactant material, and consequently characterized by a novel molecular structure of the homopolymer type which is entirely different from a conventional polyhydantoin having a molecular structure of the copolymer type. As is clear from the foregoing explanation, especially Tables 1 and 2, the polyhydantoin of this invention is not only excellent in thermal resistance, electrical strengths, mechanical strengths, and chemical resistance, but also free from the defects of the prior art, which orginate from fluctuation in the mole ratio of reactant materials, as shown in Referential Example. Consequently, it has now become possible to provide a novel type of polyhydantoin having always a high molecular weight and excellent characteristics without necessitating special consideration nor supervision regarding troublesome adjustment of the mole ratio. Therefore, it is certain that industrial merit of the present polyhydantoin is very great.

Being excellent in thermal resistance, electric strengths, mechanical strengths, and chemical resistance, the polyhydantoin of this invention may be used as a material for a borad range of applications including various moldings, lamination, impregnation, and adhesives.

What is claimed is:

1. A process for producing a polyhydantoin, which comprises heating at a temperature of 100° to 350°C at least one compound represented by the formula R'OOC—HN—R—NH—CH$_2$—COOR'', wherein R is a divalent aliphatic, cycloaliphatic, or aromatic residue, and R' and R'' are independently hydrogen or monovalent aliphatic, cycloaliphatic, or aromatic residues.

2. A process according to claim 1, wherein said compound is represented by the formula

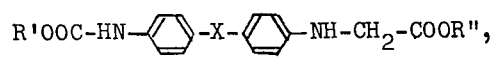

wherein R' and R'' are independently hydrogen or monovalent aliphatic, cycloaliphatic, or aromatic residues, and X is —CH$_2$—, —O—, —CO—, —SO$_2$—, —S—, or a single linkage.

Table 2

| Example No. | | 1 | 2 | 3 | 4 | 5 | 6 | 7 | 8 | 9 | 10 | Referential Example |
|---|---|---|---|---|---|---|---|---|---|---|---|---|
| Thickness of insulating film, mm | | 0.040 | 0.040 | .039 | .040 | .040 | .040 | .040 | .040 | .039 | .040 | 0.040 |
| Windability (wound on own diameter) | | OK | OK | OK | OK | OK | OK | OK | OK | OK | OK | Cracking |
| Dielectric breakdown voltage (twisted pair), kV | initial | 12.3 | 11.8 | 12.0 | 11.7 | 12.2 | 12.0 | 12.3 | 12.2 | 11.8 | 12.1 | 8.3 |
| | after aging at 250°C–24 hrs. | 10.5 | 11.0 | 11.5 | 9.6 | 12.0 | 11.7 | 12.0 | 12.2 | 9.6 | 11.8 | 5.5 |
| Abrasion resistance (repeating type, 600 g load), number of strokes | | 120 | 98 | 105 | 95 | 122 | 108 | 124 | 137 | 84 | 116 | 41 |
| Heat shock resistance (wound on own diameter) | 250°C./1hr. | OK | OK | OK | OK | OK | OK | OK | OK | OK | OK | Cracking |
| | 300°C./1hr. | OK | OK | OK | OK | OK | OK | OK | OK | OK | OK | Cracking |
| Chemical resistance (pencil hardness method) | H$_2$SO$_4$, sp.gr.1.12 | 5H | 5H | 5H | 5H | 5H | 5H | 5H | 5H | 5H | 5H | H |
| | 10 % NaOH | 5H | 5H | 5H | 5H | 5H | 5H | 5H | 5H | 5H | 5H | H |
| Heat softening performance (250°C./6hrs.; 1 kg load) | | Good | Good | Good | Good | Good | Good | Good | Good | Good | Good | Poor |
| Cut-through temperature (2 kg load),°C. | | 415 | 410 | 430 | 380 | 415 | 420 | 418 | 428 | 326 | 408 | 285 |

Note: Characteristic properties in Table 2 were measured according to NEMA-MW 1000.

3. A process according to claim 2, wherein said compound is represented by the formula

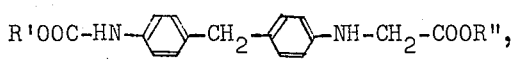

wherein R' and R'' are independently hydrogen, methyl groups, ethyl groups, or phenyl groups.

4. A process according to claim 2, wherein said compound is represented by the formula

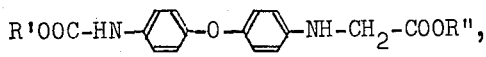

wherein R' and R'' are independently hydrogen, methyl groups, ethyl groups, or phenyl groups.

5. A process according to claim 2, wherein said compound is represented by the formula

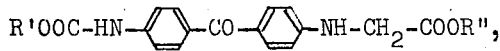

wherein R' and R'' are independently hydrogen, methyl groups, ethyl groups, or phenyl groups.

6. A process according to claim 2, wherein said compound is represented by the formula

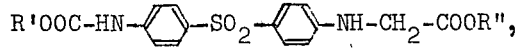

wherein R' and R'' are independently hydrogen, methyl groups, ethyl groups, or phenyl groups.

7. A process according to claim 2, wherein said compound is represented by the formula

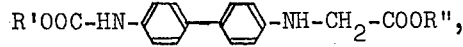

wherein R' and R'' are independently hydrogen, methyl groups, ethyl groups, or phenyl groups.

8. A process according to claim 1, wherein said compound is represented by the formula

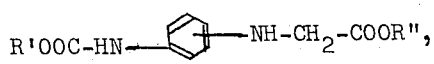

wherein R' and R'' are independently hydrogen or monovalent aliphatic, cycloaliphatic, or aromatic residues.

9. A process according to claim 8, wherein said compound is represented by the formula

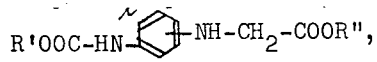

wherein R' and R'' are independently hydrogen, methyl groups, ethyl groups, or phenyl groups.

10. A process according to claim 1, wherein said compound is represented by the formula

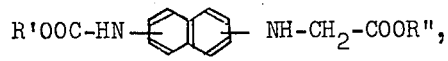

wherein R' and R'' are independently hydrogen, or monovalent aliphatic, cycloaliphatic, or aromatic residues.

11. A process according to claim 10, wherein said compound is represented by the formula

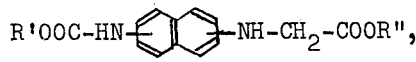

wherein R' and R'' are independently hydrogen, methyl groups, ethyl groups, or phenyl groups.

12. A process according to claim 1, wherein said compound is represented by the formula $R'OOC-HN-(CH_2)_m-NH-CH_2-COOR''$, wherein R' and R'' are independently hydrogen or monovalent aliphatic, cycloaliphatic, or aromatic residues, and $m$ is an integer from 1 to 10.

13. A process according to claim 12, wherein said compound is represented by the formula $R'OOC-HN-(CH_2)_6-NH-CH_2-COOR''$, wherein R' and R'' are independently hydrogen, methyl groups, ethyl groups or phenyl groups.

* * * * *